(12) United States Patent
Lin et al.

(10) Patent No.: US 6,819,998 B2
(45) Date of Patent: Nov. 16, 2004

(54) METHOD AND APPARATUS FOR VEHICLE STABILITY ENHANCEMENT SYSTEM

(75) Inventors: William C. Lin, Troy, MI (US); Shih-Ken Chen, Troy, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/305,426

(22) Filed: Nov. 26, 2002

(65) Prior Publication Data

US 2004/0102887 A1 May 27, 2004

(51) Int. Cl.[7] .............................................. G06F 17/00
(52) U.S. Cl. ............................. 701/70; 701/69; 701/78; 701/81
(58) Field of Search ....................... 701/70, 69, 41, 701/83, 89, 78, 81

(56) References Cited

U.S. PATENT DOCUMENTS

| | | | |
|---|---|---|---|
| 5,508,921 A | 4/1996 | Chikuma et al. | 364/424.05 |
| 5,524,079 A | 6/1996 | Ishida et al. | 364/424.05 |
| 5,606,502 A * | 2/1997 | Adachi et al. | 701/36 |
| 5,720,533 A | 2/1998 | Pastor et al. | 303/147 |
| 5,746,486 A | 5/1998 | Paul et al. | 303/146 |
| 5,813,732 A * | 9/1998 | Monzaki et al. | 303/146 |
| 6,041,886 A | 3/2000 | Nakaishi et al. | 180/444 |
| 6,112,147 A | 8/2000 | Ghoneim et al. | 701/80 |
| 6,125,319 A | 9/2000 | Hac et al. | 701/80 |
| 6,161,905 A | 12/2000 | Hac et al. | 303/146 |
| 6,169,951 B1 | 1/2001 | Ghoneim et al. | 701/70 |
| 6,175,790 B1 | 1/2001 | Lin et al. | 701/36 |
| 6,195,606 B1 | 2/2001 | Barta et al. | 701/70 |
| 6,205,391 B1 | 3/2001 | Ghoneim et al. | 701/70 |
| 6,453,226 B1 * | 9/2002 | Hac et al. | 701/48 |
| 6,505,108 B2 * | 1/2003 | Bodie et al. | 701/41 |
| 6,546,324 B1 * | 4/2003 | Chen et al. | 701/48 |
| 6,547,343 B1 * | 4/2003 | Hac | 303/146 |
| 6,622,073 B2 * | 9/2003 | Tanaka et al. | 701/38 |

OTHER PUBLICATIONS

Furukawa, Yoshimi et al., "A Review of Four–Wheel Steering Studies from the Viewpoint of Vehicle Dynamics and Control", 1989, pp. 151–186, month is not available.

Whitehead, John C., "Response and Stability of Rear Wheel Steering Vehicles", Nov. 1988, pp. 1–7.

* cited by examiner

*Primary Examiner*—Tan Q. Nguyen
(74) *Attorney, Agent, or Firm*—Kathryn A. Marra (57) ABSTRACT

A vehicle stability enhancement system for a vehicle having a vehicle subsystem includes a sensor for sensing a vehicle parameter, a vehicle control system for adjusting the vehicle subsystem, a memory having a register that includes a bank angle compensation control command, and a controller responsive to the sensor and the memory for controlling the vehicle control system.

16 Claims, 8 Drawing Sheets

METHOD AND APPARATUS FOR VEHICLE STABILITY ENHANCEMENT SYSTEM

TECHNICAL FIELD

This invention relates generally to a vehicle, and more particularly to a method and apparatus for stabilizing the vehicle using a vehicle stability enhancement (VSE) system.

BACKGROUND

Traditional vehicle chassis subsystems, such as steering, braking and suspension subsystems, are passive, meaning that their responsiveness under operating conditions is determined prior to the vehicle leaving the point of manufacture. Advances in braking system technology have led to differential braking using vehicle yaw-rate feedback. Such advances have been incorporated into vehicle stability enhancement systems, whereby an onboard controller monitors the vehicle yaw rate, determines an appropriate control command to improve vehicle directional stability, and effectuates actuation of appropriate braking mechanisms to create a corrective yaw moment. Such vehicle stability enhancement systems typically employ control algorithms based on level ground situations.

SUMMARY

In one embodiment, a vehicle stability enhancement system for a vehicle having at least one vehicle subsystem includes a sensor for sensing a vehicle parameter, a vehicle control system for adjusting the vehicle subsystem, a memory having a register including a bank angle compensation control command, and a controller responsive to the sensor and memory for controlling the vehicle control system.

In another embodiment, a method for controlling a vehicle stability enhancement system in a vehicle having a vehicle subsystem includes sensing a vehicle parameter, determining a control gain factor in response to the vehicle parameter, determining the state of a control flag in response to the vehicle parameter, calculating a control command in response to the control gain factor and the control flag, wherein the control command includes a bank angle compensation control command, and actuating a vehicle control system in response to the control command for adjusting the vehicle subsystem.

BRIEF DESCRIPTION OF THE DRAWINGS

Referring now to the figures, which are exemplary embodiments, and wherein like elements are numbered alike.

DETAILED DESCRIPTION

A detailed description of an embodiment of the present invention is presented herein by way of exemplification and not limitation with reference to FIGS. 1–13.

Vehicle

Figure 1:
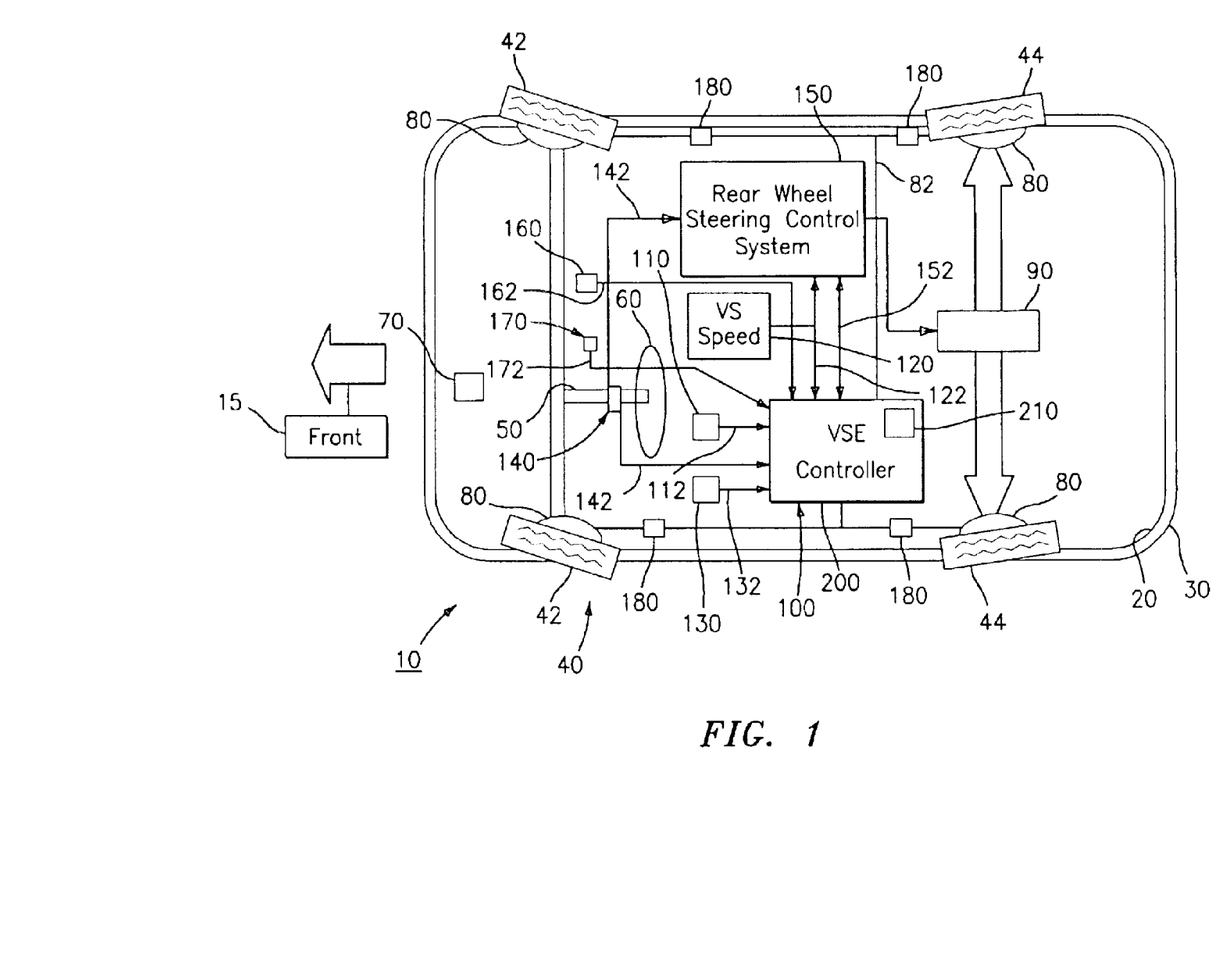
FIG. 1 depicts a generalized schematic of a vehicle operative for implementing the present invention.

FIG. 1 depicts a generalized schematic of a vehicle 10 having a front end 15, a chassis 20, a body 30 arranged on chassis 20, a set of wheels 40 rotationally coupled to chassis 20, a front wheel steering mechanism 50 arranged for steering front wheels 42, a steering wheel 60 for transferring a driver commanded steering torque to the steering mechanism 50, a braking mechanism 80 for braking the set of wheels 40 either singly or collectively upon command, a rear wheel steering mechanism 90 arranged for steering rear wheels 44, and a control system 100. Rear wheel steering mechanism 90 may be of the kind found in the rear wheel steer system of General Motors (GM) Sierra Denali pickup truck, Model-Year 2002. Steering mechanisms 50, 90, and braking mechanism 80, are alternatively referred to as a vehicle subsystems. The controller 100 includes the following sensors: a yaw rate sensor (YR) 110 for sensing the actual vehicle yaw rate; velocity sensor (VS) 120 for sensing the velocity of vehicle 10; a lateral acceleration sensor (Ay) 130, such as for example an accelerometer, for sensing the absolute value of the vehicle's lateral acceleration; and a front wheel steering angle sensor (FWSS) 140 for sensing the angle of steer of front steering mechanism 50. The sensed parameters are alternatively referred to as vehicle parameters. The control system 100 also includes a rear wheel steering mechanism control system 150, which may include, for example, electronically controlled actuators and dampers, for adjusting the rear wheel steering mechanism 90, and braking mechanism control system 180 (e.g., electronically controlled actuators and dampers) for actuating braking mechanism 80 upon command. The mechanism control systems 150 and 180 are alternatively referred to as a vehicle control systems. The control system 100 further includes: a two-wheel drive/four-wheel drive (2WD/4WD) mode selection switch 160 for selecting a two-wheel drive or four-wheel drive driving mode, a trailer mode selection switch 170 for selecting a driving mode that accounts for the presence or absence of a towed trailer; and a central controller 200 arranged in operable communication with sensors 110, 120, 130, 140, and vehicle control system 150. Control lines 82, 112, 122, 132, 142, 152, 162, 172, are depicted, for simplicity, as single lines, but represent both signal communication lines and operational links for communicating with controller 200 and/or actuating the vehicle control system 150.

2WD/4WD mode selection switch 160 and trailer mode selection switch 170 may be a pushbutton type switch or a toggle type switch, or any other type of switch suitable for producing an appropriate mode selection signal. Switches 160, 170 may also include a display (not shown) for providing feedback to the driver regarding the driving mode selection. Controller 200 includes a memory 210 for storing sensor information, register information, flag settings, look-up tables of gain factors, and any other relevant information, as discussed below. The vehicle electrical system 70 provides electrical power to all of the vehicle's electrically operated systems, including the controller 200 and the vehicle control system 150.

It will be appreciated that while the disclosed embodiment refers to a vehicle, such as an automobile, having four wheels, the invention described herein is applicable to any vehicle with any number of wheels that may be arranged to employ rear wheel steering.

Nomenclature

The nomenclature used herein for implementing the present invention includes the following variables:

L=vehicle wheel base;

$K_u$=vehicle understeer coefficient, for example, 6 deg/g;

$V_x$=vehicle speed (kilometers-per-hour, kph);

$V_{th}$=vehicle speed threshold (kilometers-per-hour, kph), for example, 10-kph;

$\delta_f$=front wheel steering angle from sensor;

$\delta_r$=open-loop rear wheel steering angle;

$\delta_m$=difference between $\delta_f$ and $\delta_r$, ($\delta_f - \delta_r$);

R/F=ratio of rear steering angle to front steering angle;

YR=vehicle actual yaw rate, (degrees-per-second, deg/sec));

$A_y$=vehicle lateral acceleration (g-force);

T=control sampling time interval, for example, 10-milliseconds (msec);

Cntr=logic counter (a count of one equates to a time period of T);

$C_O$=predefined value for logic counter, for example, 500 (500*T=5 seconds);

$K_{YR}$=yaw rate control gain factor;

$K_{SR}^*$=side-slip rate control gain factor on level ground;

$K_{SR}$=side-slip rate control gain factor on a suface having a bank angle;

$DB1_{YR}$=first yaw rate deadband threshold;

$DB2_{YR}$=second yaw rate deadband threshold;

$DB1_{SR}$=first side-slip rate deadband threshold;

$DB2_{SR}$=second side-slip rate deadband threshold;

Ctl_YR=yaw rate control flag;

Ctl_SR side-slip rate control flag.

Quotations (" ") surrounding a variable name represent a register in memory 210 containing the value of the respective variable, "| |" designates an "absolute value" operator, and a single quotation (') following a variable name designates a "derivative" operator. A variable name presented in an equation represents a value associated with the respective variable, and a variable name presented in a process represents a command having a command signal associated with a related value stored in a register in memory 210.

Controller Generally

Controller 200 is a microprocessor based control system adapted for controlling vehicle subsytems, and more particularly, for controlling the braking mechanism 80 and the rear wheel steering mechanism 90 in accordance with control logic described herein. Controller 200 typically includes a microprocessor, a memory 210, such as, for example, ROM and RAM, and appropriate input and output circuits of a known type for receiving the various input signals and for outputting the various control commands to the various actuators and control systems. The control logic implemented by controller 200 is cycled at a control sampling rate of T, and is best seen by referring to FIGS. 2–10.

Figure 2:
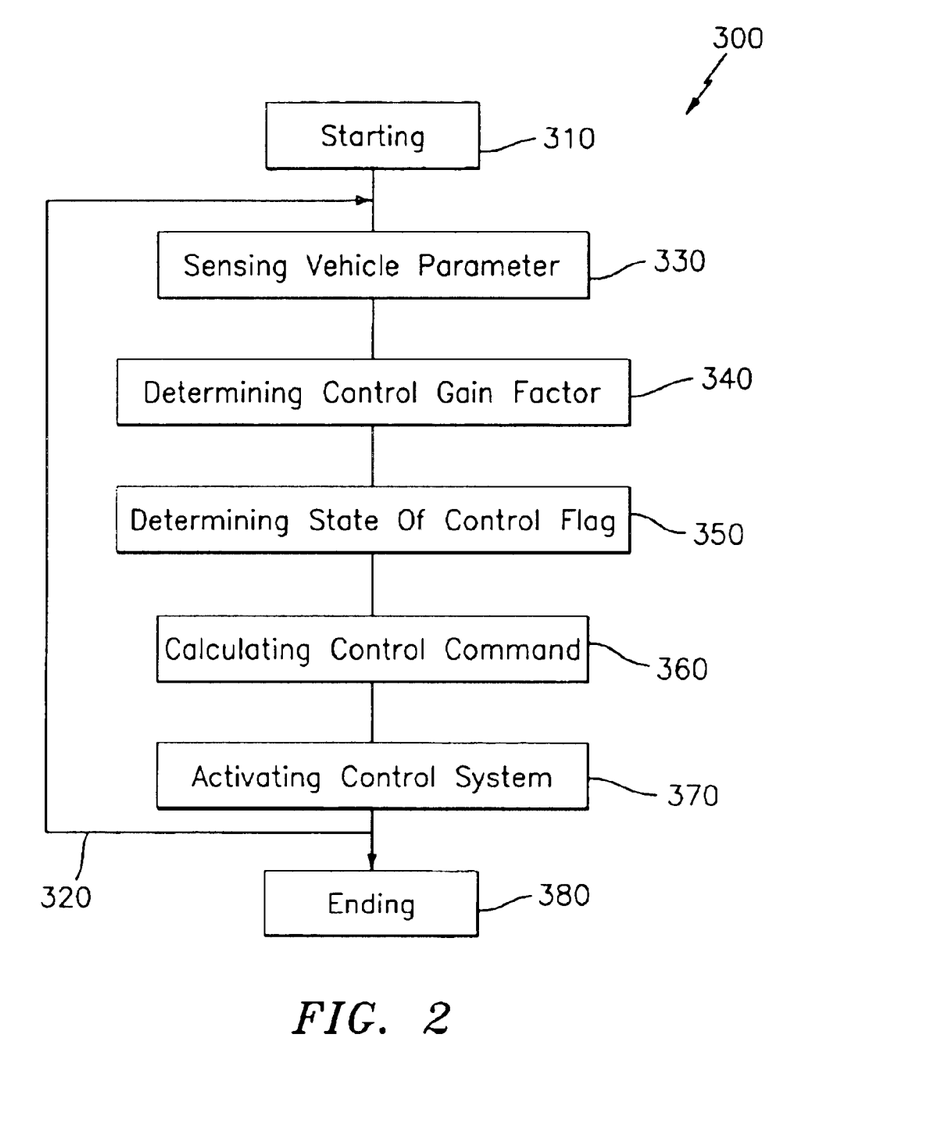
FIG. 2 depicts a generalized flowchart of a process for implementing the present invention.
Figure 3:
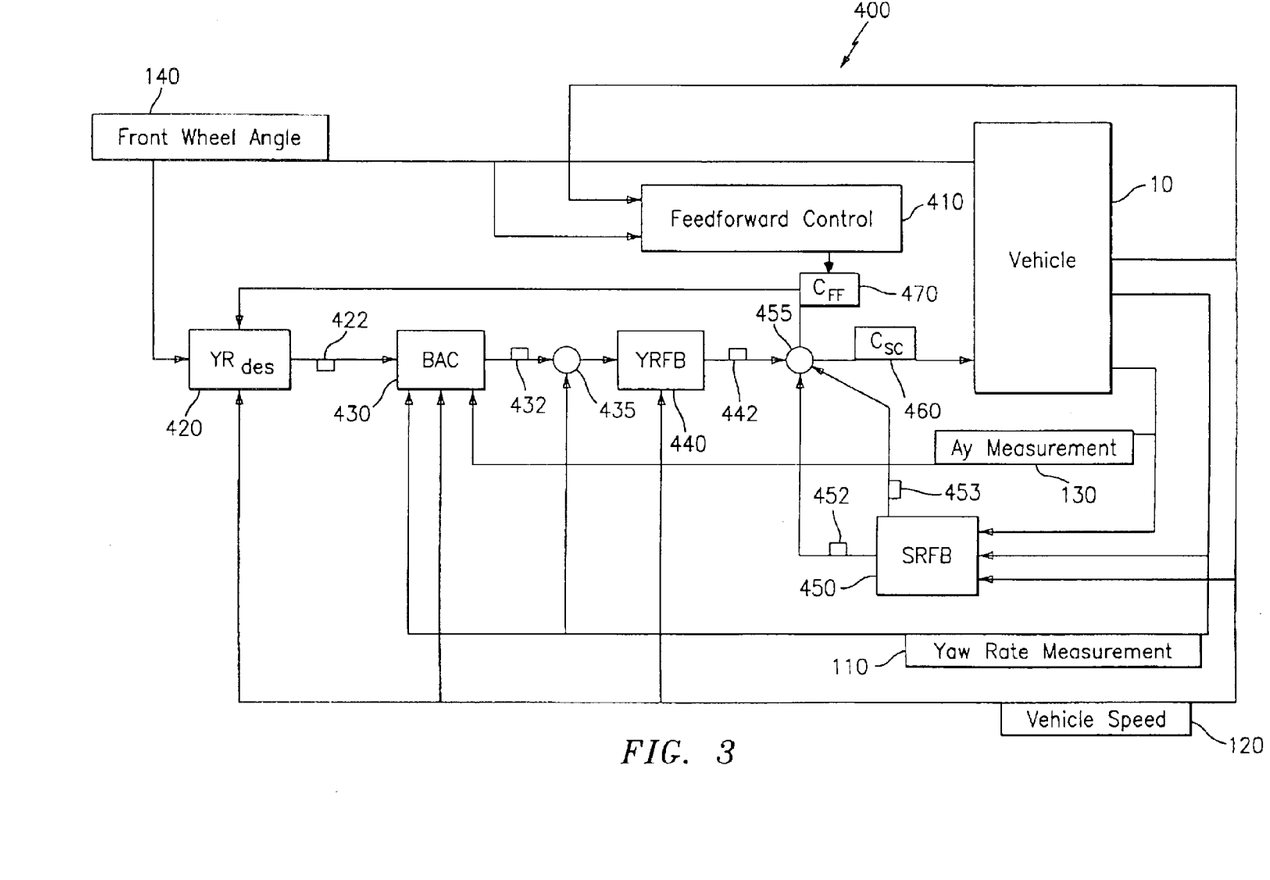
FIG. 3 depicts a block diagram of a control system for implementing the present invention.
Figure 4:
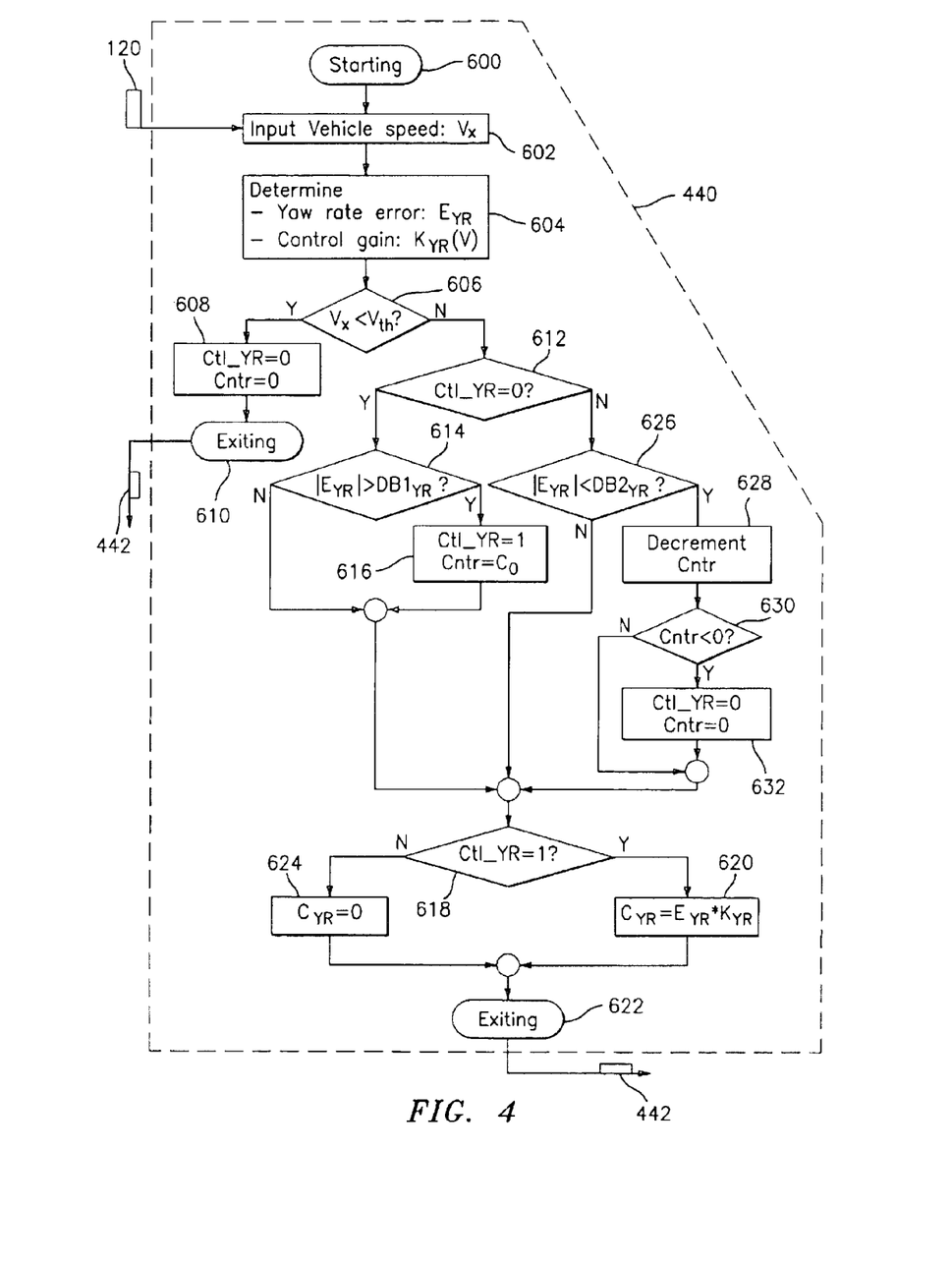
FIG. 4 depicts a flowchart of a process for determining a yaw rate control command for use in the control system of FIG. 3.
Figure 5:
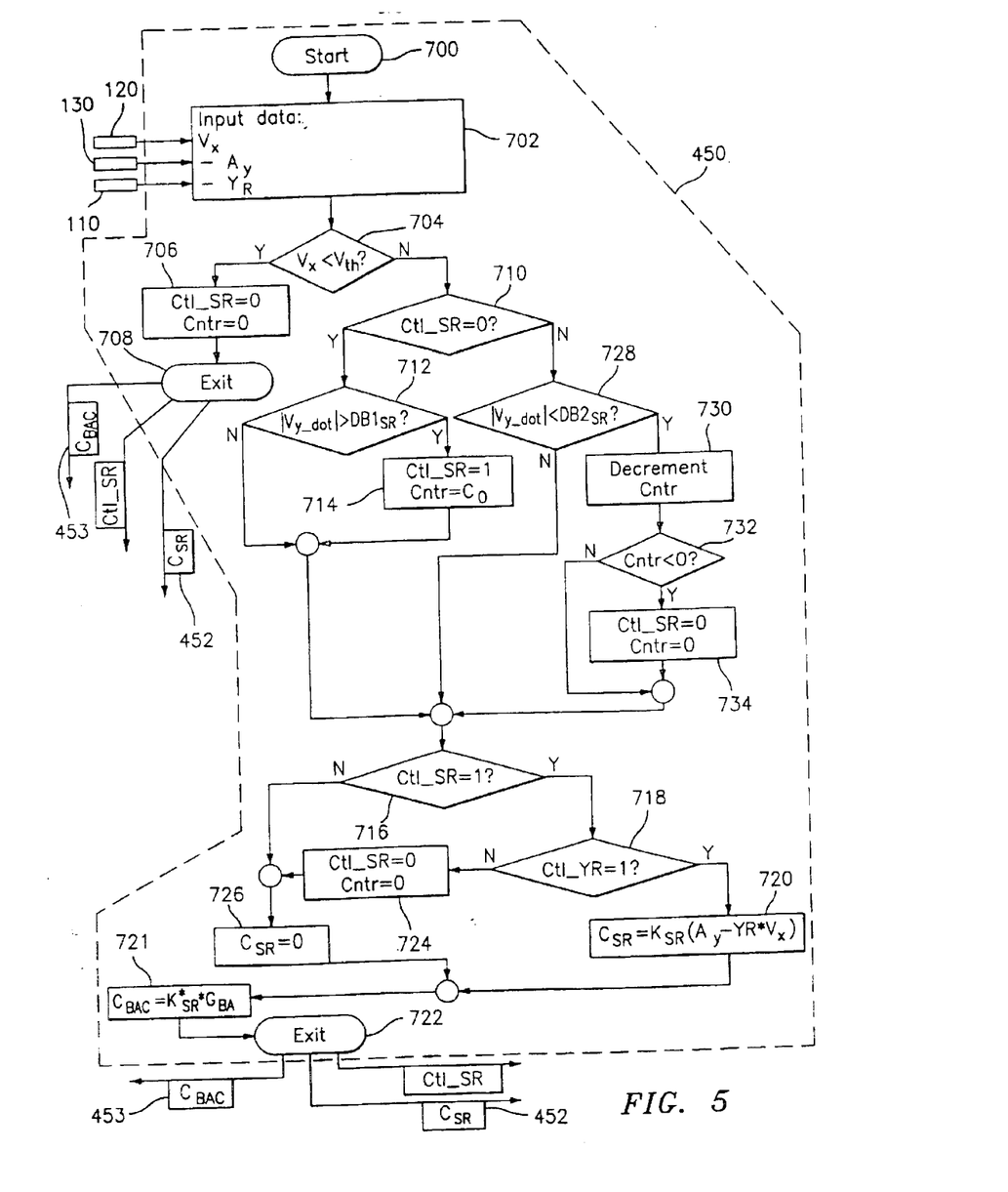
FIG. 5 depicts a flowchart of a process for determining a side-slip rate control command and a bank angle compensation control command for use in the control system of FIG. 3.
Figure 6:
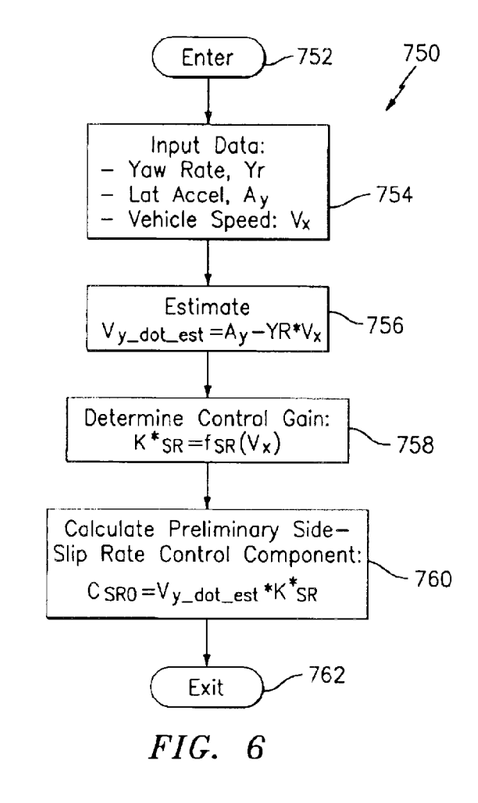
FIG. 6 depicts a flowchart of a process for determining a preliminary side-slip rate control command for use in the process of FIG. 5.
Figure 7:
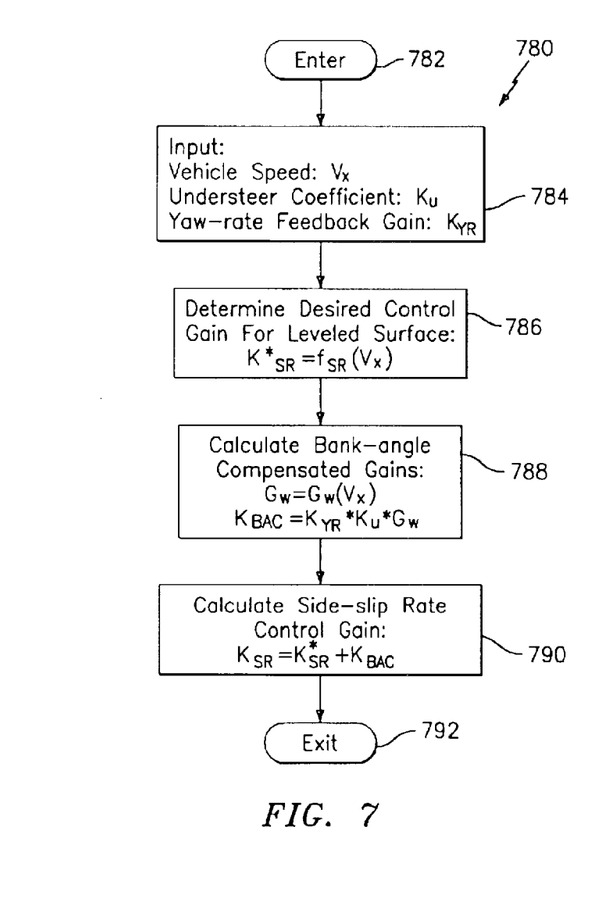
FIG. 7 depicts a flowchart of a process for determining a side-slip control gain for use in the process of FIG. 5.
Figure 8:
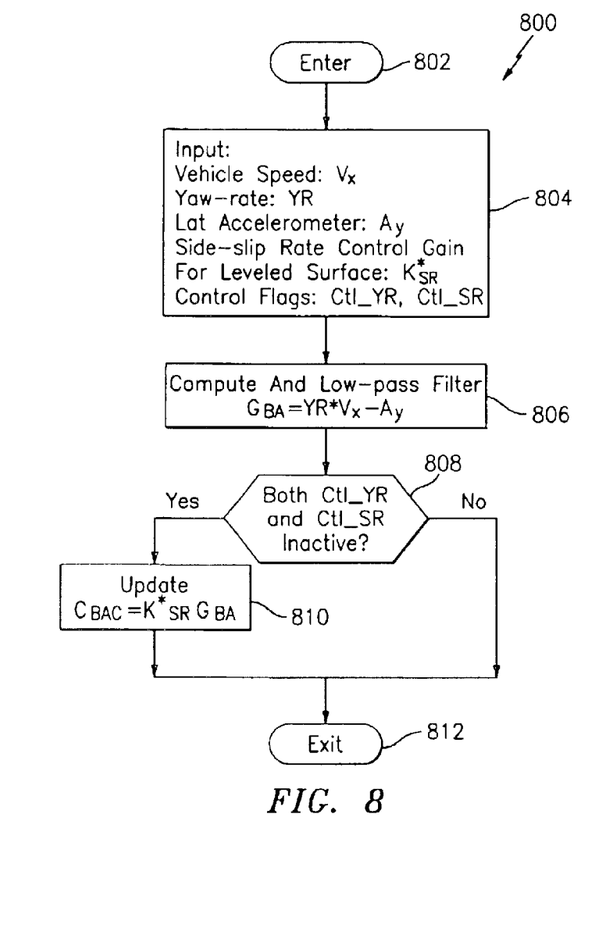
FIG. 8 depicts a flowchart of a process for determining a bank angle compensation control command for use in the process of FIG. 5.
Figure 9:
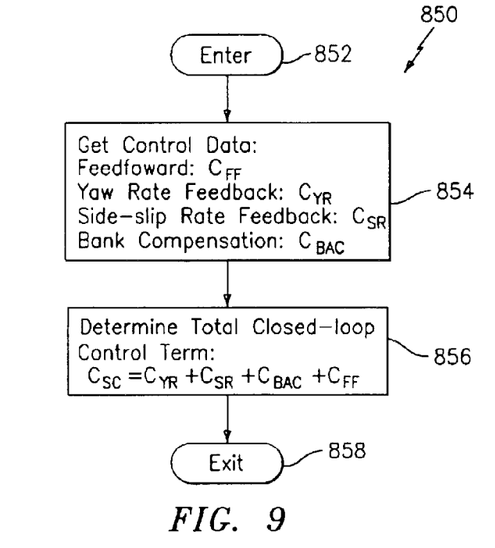
FIG. 9 depicts a flowchart of a process for determining a stability control command for use in the control system of FIG. 3.
Figure 10:
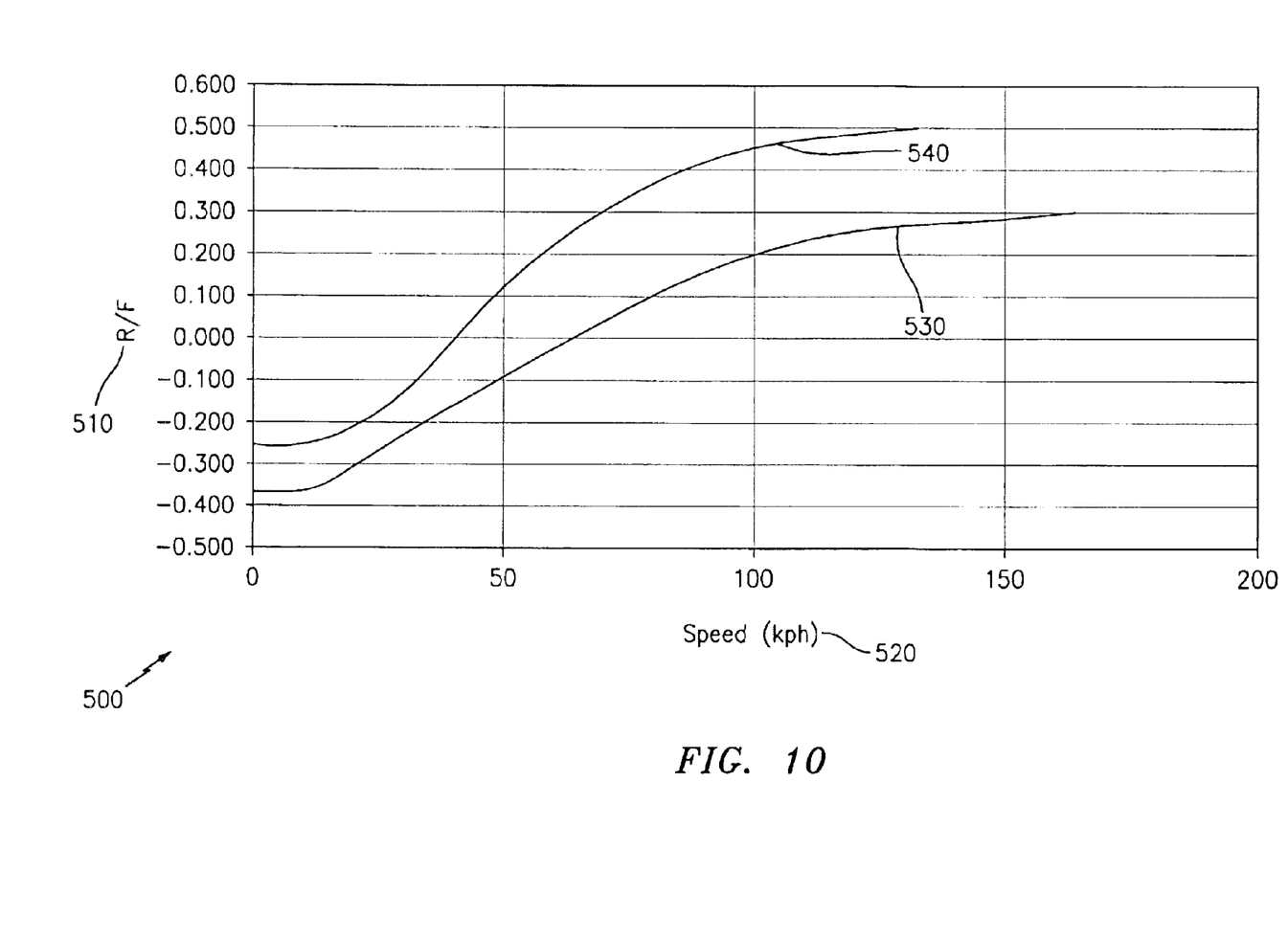
FIG. 10 depicts a graphical representation of a process gain factor as a function of vehicle velocity for use in the control system of FIG. 3.

In general, FIGS. 2–9 depict a series of flowcharts and block diagrams that represent the logic that is implemented by controller 200. FIG. 2 depicts a generalized flowchart of the process 300 for implementing the present invention, while FIG. 3 depicts the block diagram 400 of a control system for implementing the present invention. The block diagram of FIG. 3 is broken up into sub-processes that are discussed below or depicted by FIGS. 4 and 5. FIG. 4 depicts a flow chart of a yaw rate feedback (YRFB) process, and FIG. 5 depicts a flow chart of a side-slip rate feedback (SRFB) process. Control logic passes to each of the sub-processes as appropriate and then returns to the main process of FIG. 3. The sub-process depicted by FIG. 5 has sub-sub-processes as depicted by FIGS. 6, 7, and 8. FIG. 6 depicts a flowchart for calculating a preliminary side-slip rate control command component ($C_{SR0}$). FIG. 7 depicts a flowchart for calculating a side-slip rate control gain factor ($K_{SR}$). FIG. 8 depicts a flowchart for calculating a bank angle compensation control command ($C_{BAC}$). A bank angle as it relates to a road surface is described generally as a curve in road surface where the curved portion of the road has a banked angle. The flowchart of FIG. 9 depicts an integrator process for combining the various control command components to provide a stability control command. The graphical representation of gain factors depicted in FIG. 10 is used in the feedforward control process of FIG. 3.

Control Algorithm

Referring to FIG. 2, a generalized flowchart 300 for implementing the present invention begins at start 310, which includes an initialization procedure that resets all of the system flags, registers, timers, counters and control commands to zero unless otherwise noted. Control logic then enters control loop 320, which includes the steps of sensing 330 vehicle parameters from the various sensors discussed above, and more specifically for sensing the vehicle speed, the front wheel steering angle, the vehicle yaw rate, and the vehicle lateral acceleration, determining 340 control gain factors from, for example, look-up tables, determining 350 the state of control flags, for example, the yaw rate and side-slip rate control flags, calculating 360 a control command for control systems 150, 180, and actuating 370 control mechanisms 80, 90 in response thereto. One pass through control loop 320 is completed for each sampling interval T. Process 300 ends 380 when controller 200 interrupts the process or electrical system 70 powers down.

Referring now to FIG. 3, a process 400, in block diagram representation, is presented, which represents the control loop 320 process of FIG. 2. Process 400 includes a feedforward control process, block 410, a desired yaw rate (YRdes) process, block 420, a bank angle compensation (BAC) process, block 430, a yaw rate feedback (YRFB) process, block 440, and a side-slip rate feedback (SRFB) process, block 450. Process 400 also depicts vehicle 10 with sensor outputs for yaw rate sensor 110, velocity sensor 120, lateral acceleration sensor 130, and front wheel steering angle sensor 140. A stability control command ($C_{SC}$) 460 provides process input to vehicle 10, whereby controller 200 provides appropriate control commands to braking mechanism control system 180 for actuating braking mechanism 80, and rear wheel steering mechanism control system 150 for actuating rear wheel steering mechanism 90, in response thereto. If vehicle 10 is equipped with both (differential) braking mechanism 80 and rear wheel steering mechanism 90, then both respective control systems 180, 150 are activated, otherwise only the one available control system and mechanism is activated.

Feedforward Control

The feedforward control process of block 410 (also referred to as open-loop control process) shown in FIG. 3 receives inputs from velocity sensor 120 and front wheel steering angle sensor 140, and provides the output feedforward command ($C_{FF}$) 470 as determined by $\delta_r$ (rear wheel steering angle) from Equation 1.

$$\delta_r = R/F * \delta_f \quad \text{Equa. 1.}$$

The value for $\delta_f$ (front wheel steering angle) in Equation 1 is provided by front wheel steering angle sensor 140. The value for R/F in Equation 1 is obtained from the information contained in the graph depicted in FIG. 10, which may be provided by a curve fit equation or a look-up table (not shown). Referring now to FIG. 10, a graph 500 depicting R/F 510 as a function of vehicle speed $V_x$ 520 is shown for two conditions; non-trailering 530 and trailering 540. Trailer mode selection switch 170, suitably located for access by a driver, provides controller 200 with information regarding the trailering condition. Provided with a trailering mode 530, 540 from switch 170, the vehicle speed 520 from sensor 120, and the front wheel steering angle $\delta_f$ from sensor 140, controller 200 determines an appropriate value for R/F 510 from FIG. 10, and applies Equation 1 to determine a value $\delta_r$ for the feedforward command 470 output (the feedforward command $C_{FF}$ 470 is synonomous with the rear wheel steering angle $\delta_r$ from Equation 1).

As shown in FIG. 10, the value of R/F for both trailering and non-trailering modes is negative for vehicle speeds less than approximately 35-kph and positive for vehicle speeds greater than approximately 65-kph. Where the R/F ratio is positive, the open-loop rear wheel steering is said to be in-phase with, or steered in the same direction as, the front wheels. Where the R/F ratio is negative, the open-loop rear wheel steering is said to be out-of-phase with, or steered in the opposite direction to, the front wheels. With such open-loop rear wheel steering, the vehicle stability can be enhanced at both low and high speeds. However, additional vehicle stability enhancement can be achieved by combining the feedforward control, or open-loop rear wheel steering control, with bank angle compensated yaw rate feedback and side-slip rate feedback controls, as discussed below.

Uncompensated Desired Yaw Rate

The desired yaw rate (YRdes) process of block 420, shown in FIG. 3, receives inputs from velocity sensor 120, front wheel steering angle sensor 140, and feedforward control 410, and provides the output uncompensated desired yaw rate (YRd) 422, in accordance with Equation 2.

$$YRd = \frac{V_x}{L + K_u V_x^2} (\delta_f - \delta_r). \quad \text{Equa. 2}$$

Bank Angle Compensation

The bank angle compensation (BAC) process of block 430, shown in FIG. 3, receives the inputs YRd 422, yaw rate (YR) from sensor 110, vehicle speed Vx from sensor 120, and lateral acceleration (Ay) from sensor 130, and provides the output, bank-angle-compensation-yaw-rate (YRb) 432, in accordance with Equation 3.

$$YRb = YRd - K_u G_w(Vy\_dot - g \sin(\phi)), \quad \text{Equa. 3}$$

where $$G_w = \frac{V_x}{L + K_u V_x^2} \quad \text{Equa. 4}$$

Vy_dot=vehicle side-slip rate, and gSin($\phi$)=gravitational acceleration due to road banking.

To better understand the relationship between the variables of Equation 3 and the sensor inputs, it should be appreciated that lateral acceleration sensor 130 contains the following information;

$$Ay = Vy\_dot + YR*V_x - g \sin(\phi). \quad \text{Equa. 5}$$

Rearranging terms provides, $$Ay - YR*V_x = Vy\_dot - g \sin(\phi), \quad \text{Equa. 6}$$

and in accordance with the present invention, the bank angle compensated yaw rate (YRb) is defined as, $$YRb = YRd - K_u G_w(Ay - YR*V_x), \quad \text{Equa. 7}$$

which is combined with Equation 6 to provide Equation 3 above.

The value for the side-slip rate Vy_dot may also be determined by rearranging Equation 5 to obtain;

$$Vy\_dot = Ay - YR*V_x + g \sin(\phi). \quad \text{Equa. 8}$$

The term gSin($\phi$) represents acceleration due to the road bank angle and is a low frequency signal, while the term Vy_dot, which represents the vehicle side-slip rate, is a high frequency signal. Thus, if the resulting signal from (Ay−YR*$V_x$) is passed through a low-pass filter of known design, the high frequency content of the vehicle side-slip rate information can be essentially removed, thereby isolating the low and high frequency contents.

Yaw-Rate Integrator

Yaw-rate integrator process of block 435 in FIG. 3 receives the inputs YRb 432 and YR from sensor 110, and provides the output yaw rate error ($E_{YR}$) according to Equation 9.

$$E_{YR} = YR - YRb. \quad \text{Equa. 9}$$

Yaw-Rate Feedback

The yaw-rate feedback (YRFB) process of block 440 in FIG. 3 receives the inputs $E_{YR}$ from block 435 and $V_x$ from sensor 120, and provides a yaw-rate control command component $C_{YR}$ 442 output in accordance with FIG. 4.

Referring now to FIG. 4, the YRFB process, block 440, starts at block 600 and then proceeds to block 602 where the input value $V_x$ is received. At block 604, the yaw rate error $E_{YR}$ is determined, as discussed above, and a yaw-rate control gain factor $K_{YR}$ is determined by controller 200 entering look-up Table-1, shown below, with vehicle velocity $V_x$ and exiting with control gain factor $K_{YR}$.

TABLE 1

| Vehicle Speed (V$_x$) | 0 | 24 | 29 | 34 | 40 | 60 | 80 | 100 | 120 |
|---|---|---|---|---|---|---|---|---|---|
| Gain Factor K$_{YR}$ | 0 | 0.326 | 0.618 | 0.101 | 0.07 | 0.055 | 0.055 | 0.03 | 0 |

Controller 200 performs interpolation or extrapolation calculations on the values of Table-1 as necessary to obtain intermediate or out-of-bound values. It will be appreciated in later references to look-up tables, that the interpolation/extrapolation operation performed by controller 200 on Table-1 is also applicable to the analysis involving other look-up table values. The process of FIG. 4 then proceeds to block 606 where it is determined whether V$_x$ is less than a threshold velocity V$_{th}$ (for example, 10 kilometers-per-hour). If the conditions of block 606 are satisfied, control logic passes to block 608 where the yaw-rate control flag (Ctl_YR) is set to (0) and the logic counter (Cntr) is set to (0). After block 608, the process of FIG. 4 exits at block 610 where control logic passes back to the process of FIG. 3 from whence it came.

If the conditions of block 606 are not satisfied, control logic passes to block 612 where it is determined whether the yaw-rate control flag is set to (0). If the conditions of block 612 are satisfied, control logic passes to block 614 where it is determined whether the absolute value of the yaw-rate error |E$_{yR}$| is greater than a first yaw rate deadband threshold DB1$_{YR}$, shown in look-up Table-2.

TABLE 2

| Vehicle Speed (V$_x$) | 0 | 10 | 25 | 30 | 60 | 80 | 100 |
|---|---|---|---|---|---|---|---|
| Deadband DB1$_{YR}$ | 15 | 12 | 9 | 8 | 7 | 8 | 9 |

If the conditions of block 614 are satisfied, control logic passes to block 616 where the yaw-rate control flag (Ctl_YR) is set to (1) and the logic counter (Cntr) is set to a predetermined value (C$_0$), for example, C$_0$=500. A Cntr value of (1) relates to one time interval of T=0.010-seconds. Thus, C$_0$=500 relates to a time of 5-seconds. After block 616, or if the conditions of block 614 are not satisfied, control logic passes to block 618 where it is determined whether the yaw-rate control flag (Ctl_YR) is set to (1). If the conditions of block 618 are satisfied, control logic passes to block 620 where the yaw-rate control component C$_{YR}$ is calculated in accordance with Equation 10.

$$C_{YR}=E_{YR}*K_{YR}.$$  Equa. 10

After block 620, control logic exits the process of FIG. 4 at block 622 and returns to the process of FIG. 3 from whence it came. If the conditions of block 618 are not satisfied, control logic passes to block 624 where the yaw-rate control component C$_{YR}$ is set to (0). After block 624, control logic passes to block 622 where it proceeds as described above.

If the conditions of block 612 are not satisfied, control logic passes to block 626 where it is determined whether the absolute value of the yaw-rate error |E$_{YR}$| is less than a second yaw rate deadband threshold DB2$_{YR}$, shown in look-up Table-3.

TABLE 3

| Vehicle Speed (V$_x$) | 0 | 30 | 60 | 80 | 100 |
|---|---|---|---|---|---|
| Deadband DB2$_{YR}$ | 11 | 5 | 3 | 4 | 5 |

If the conditions of block 626 are satisfied, control logic passes to block 628 where the logic counter (Cntr) is decremented. After block 628, block 630 determines whether logic counter (Cntr) is less than (0). If the conditions of block 630 are satisfied, the yaw-rate control flag (Ctl_YR) is set to (0) and the logic counter (Cntr) is set to (0) at block 632. After block 632, or if the conditions of block 630 are not satisfied, or if the conditions of block 626 are not satisfied, control logic passes to block 618 and the process continues as discussed above.

Upon exiting the process of FIG. 4 at either block 610 or 622, control logic passes back to the process of FIG. 3 with a value for Ctl_YR and C$_{YR}$ 442 from whence it came.

Side-Slip Rate Feedback

The side-slip rate feedback (SRFB) process of block 450 in FIG. 3 receives the inputs YR from sensor 110, V$_x$ from sensor 120, and Ay from sensor 130, and provides side-slip rate control command (CSR) 452 and bank angle compensation control command (C$_{BAC}$) 453 outputs in accordance with FIG. 5.

Referring now to FIG. 5, the SRFB process, block 450, starts at block 700 and then proceeds to block 702 where the input values for Ay from sensor 130, V$_x$ from sensor 120, and YR from sensor 110 are received. After block 702, control logic passes to block 704 where it is determined whether V$_x$ is less than a threshold velocity V$_{th}$ (for example, 10 kilometers-per-hour). If the conditions of block 704 are satisfied, control logic passes to block 706 where the side-slip rate control flag (Ctl_SR) is set to (0) and logic counter (Cntr) is set to (0). The process of block 450 exits at block 708 with a value for Ctl-SR and with the values of the side-slip rate feedback control command (C$_{SR}$) 452 and bank angle compensation control command (C$_{BAC}$) 453 unchanged.

If the conditions at block 704 are not satisfied, control logic passes to block 710 where it is determined whether Ctl_SR is equal to (0). If Ctl_SR is (0), then it is determined at block 712 whether the absolute value of the side-slip rate (|Vy_dot|) is greater than a first side-slip rate deadband threshold DB1$_{SR}$. shown in look-up Table-4.

TABLE 4

| Vehicle Speed (V$_x$) | 0 | 10 | 25 | 30 | 48 | 56 | 80 | 100 |
|---|---|---|---|---|---|---|---|---|
| Deadband DB1$_{SR}$ | 0 | 1 | 2 | 3 | 5 | 4 | 2.9 | 4 |

If the conditions at block 712 are satisfied, then at block 714, Ctl_SR is set to (1) and Cntr is set to C$_0$. After block 714, or if the conditions of block 712 are not satisfied, control logic passes to block 716 where it is determined whether Ctl_SR is (1). If Ctl_SR is (1), then it is determined at block 718 whether Ctl_YR is (1). If Ctl_YR is (1), then at block 720, $C_{SR}$ is set in accordance with Equation 11 and FIG. 7 as discussed below.

$$C_{SR}=K_{SR}(Ay-YR*V_x) \qquad \text{Equa. 11}$$

After block 720, control logic passes to block 721 where a value for $C_{BAC}$ (bank angle compensation command) is calculated in accordance with FIG. 8 discussed below. After block 721, the process of FIG. 5 exits at block 722 with a value for Ctl_SR, $C_{SR}$ 452 and $C_{BAC}$ 453.

If the conditions at block 718 are not satisfied, control logic passes to block 724 where Ctl_SR is set to (0) and Cntr is set to (0). After block 24, $C_{SR}$ is set to (0) at block 726 and then the process of FIG. 5 exits at block 722 as discussed above. If the conditions of block 716 are not satisfied, then control logic passes to block 726 and proceeds as discussed above. If the conditions of block 710 are not satisfied, control logic passes to block 728 where it is determined whether the absolute value of the side-slip rate (|Vy_dot|) is less than a second side-slip rate deadband threshold $DB2_{SR}$, shown in look-up Table-5.

TABLE 5

| Vehicle Speed ($V_x$) | 0 | 10 | 25 | 30 | 48 | 60 | 80 | 100 |
|---|---|---|---|---|---|---|---|---|
| Deadband $DB2_{SR}$ | 0 | 0.7 | 1.2 | 1.7 | 3 | 2.2 | 1.5 | 2.2 |

If the conditions at block 728 are satisfied, then Cntr is decremented at block 730, and at block 732 it is determined whether Cntr is less than (0). If Cntr is less than (0), then at block 734 Ctl_SR is set to (0) and Cntr is set to (0). After block 734, or if the conditions of block 732 are not satisfied, or if the conditions of block 728 are not satisfied, control logic passes to block 716 and proceeds as discussed above.

Upon exiting the process of FIG. 5 at either block 708 or 722, control logic passes back to the process of FIG. 3 with a value for Ctl_SR and $C_{SR}$ 452 from whence it came.

Referring now to FIG. 6, the process for calculating $C_{SR0}$, as used in block 720 of FIG. 5, is provided. $C_{SR0}$ represents the side-slip rate (Vy_dot) multiplied by a desired side-slip rate control gain factor ($K_{SR}^*$) for level ground conditions. The process 750 of FIG. 6 enters at block 752 and then proceeds to block 754 where the input parameters for yaw rate (YR) from sensor 110, lateral acceleration (Ay) from sensor 130, and vehicle velocity ($V_x$) from sensor 120, are received. At block 756, an estimate for side-slip rate (Vy_dot_est) is made according to Equation 12.

$$Vy\_dot\_est=Ay-YR*V_x. \qquad \text{Equa. 12}$$

The term Vy_dot est in Equation 12 is considered an estimate for Vy_dot since it does not include the low frequency component of $gSin(\phi)$ as shown in Equation 8 (see discussion above regarding high and low frequency content of sensor signals). At block 758, control logic enters look-up Table-6, shown below, with a known vehicle velocity ($V_x$) from sensor 120 and exits with a value for gain factor $K_{SR}^*$, where the above noted interpolation/extrapolation operation applies.

TABLE 6

| Vehicle Speed ($V_x$) | 0 | 19 | 43 | 63 | 82 | 96 | 120 |
|---|---|---|---|---|---|---|---|
| Deadband $K_{SR}^*$ | 0 | 0.28 | 0.46 | 0.87 | 1.05 | 1.07 | 1.1 |

At block 760, the value for $C_{SR0}$ is calculated according to Equaion 13.

$$C_{SR0}=Vy\_dot\_est*K_{SR}^*. \qquad \text{Equa. 13}$$

The process 750 of FIG. 6 exits at block 762 and returns to block 720 of FIG. 5 with the value $C_{SR0}$.

Referring now to FIG. 7, the process for calculating $K_{SR}$, as used in block 720 of FIG. 5, is provided. In general, $K_{SR}$ represents the side-slip rate control gain for non-level ground conditions, determined in accordance with Equation 14 below, which is basically the side-slip rate control gain factor ($K_{SR}^*$) modified by a bank angle control gain factor ($K_{BAC}$), which will now be discussed in reference to the process of FIG. 7.

$$K_{SR}=K_{SR}^*+K_{BAC} \qquad \text{Equa. 14}$$

The process 780 of FIG. 7 enters at block 782 and then proceeds to block 784 where the process input parameters of vehicle velocity (Vx) from sensor 120, understeer coefficient (Ku), and yaw rate feedback gain ($K_{YR}$) from look-up Table-1, are received. At block 786, the control logic determines the value for gain factor $K_{SR}^*$ from look-up Table-6, as discussed above, and proceeds to block 788. At block 788, the value for $G_w$ is calculated in accordance with Equation 4 above, and the value for $K_{BAC}$ is caculated in accordance with Equation 15.

$$K_{BAC}=K_{YR}*K_u*G_w. \qquad \text{Equa. 15}$$

After block 788, the process continues to block 790 where the value for $K_{BAC}$ from Equation 15 is used in Equation 14 to provide the value for $K_{SR}$. After block 790, the process 780 of FIG. 7 exits at block 792 and returns to block 720 of FIG. 5 with the value $K_{SR}$.

Referring now to FIG. 8, the $C_{BAC}$ (bank angle compensation command) process 800 is shown, which is another control command component that is determined in the SRFB 450 process. Process 800 is entered at block 802 and then proceeds to block 804 where the input parameters of vehicle velocity ($V_x$) from sensor 120, vehicle yaw rate (YR) from sensor 110, vehicle lateral acceleration (Ay) from sensor 130, side-slip rate control gain for level ground ($K_{SR}^*$) from look-up Table-6 above, yaw rate control flag (Ctl_YR) from the process of block 440 in FIG. 4, and side-slip rate control flag (Ctl_SR) from the process of block 450 in FIG. 5, are received. At block 806, a bank angle gain $G_{BA}$ is calculated in accordance with Equation 16 and passed through a low-pass filter, as discussed above, to remove the high frequency content of the vehicle side-slip rate information.

$$G_{BA}=YR*V_x-Ay. \qquad \text{Equa. 16}$$

At block 808, it is determined whether both Ctl_YR and Ctl_SR are inactive (i.e., set to zero). If both are inactive, then at block 810, $C_{BAC}$ is calculated in accordance with Equation 17, otherwise $C_{BAC}$ is not updated.

$$C_{BAC}=K_{SR}^**G_{BA}. \qquad \text{Equa. 17}$$

After block 810, or if the conditions of block 808 are not satisfied, the process of FIG. 8 exits at block 812 and returns to the process of block 450 from whence it came with an updated value for $C_{BAC}$ 453.

Integrator

Referring now back to FIG. 3, integrator 455 combines the various control commands $C_{YR}$ 442, $C_{SR}$ 452, $C_{BAC}$ 453, and $C_{FF}$ 470, to provide a stability control command $C_{SC}$ 460 in accordance with FIG. 9. Referring now to FIG. 9, the integration process 850 enters at block 852 and then proceeds to block 854 where the various control command inputs ($C_{YR}$ 442, $C_{SR}$ 452, $C_{BAC}$ 453, and $C_{FF}$ 470) are received. After block 854, the stability control command $C_{SC}$ 460 is calculated in accordance with Equation 18.

$$C_{SC}=C_{YR}+C_{SR}+C_{BAC}+C_{FF}. \quad \text{Equa. 18}$$

The process of FIG. 9 exits at block 858 and returns to the process of block 455 in FIG. 3 with a value for the stability control command $C_{SC}$ 460.

Controller 200 applies $C_{SC}$ 460 to control the rear wheel steering mechanism control system 150 and the braking mechanism control system 180, thereby enabling actuation of braking mechanism 80 and rear wheel steering mechanism 90 for enhanced vehicle stability with bank angle compensation. Controller 200 may be programmed to recognize the presence or absence of a particular control system, and to apply the stability control command $C_{SC}$ to vehicles with a rear wheel steering mechanism control system 150, a braking mechanism control system 180, or both. An alternative embodiment may include a vehicle roll angle sensor for providing additional sensor input for the control logic.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle stability enhancement system for a vehicle having a vehicle subsystem, comprising:
   a sensor for sensing a vehicle parameter;
   a vehicle control system for adjusting the vehicle subsystem;
   a memory comprising a first register including a bank angle compensation control command, a second register including a yaw rate control command, and a third register including a side-slip rate control command; and
   a controller responsive to said sensor and said memory for controlling said vehicle control system;
   wherein said memory further comprises a fourth register including a feedforward control command, said feedforward control command being determined by a rear wheel steering angle.

2. The vehicle stability enhancement system of claim 1, wherein said vehicle control system comprises a braking mechanism control system.

3. The vehicle stability enhancement system of claim 2, wherein said vehicle control system further comprises a rear wheel steering mechanism control system.

4. The vehicle stability enhancement system of claim 1, wherein said vehicle control system comprises a rear wheel steering mechanism control system.

5. A vehicle stability enhancement system for a vehicle having a vehicle subsystem, comprising:
   a sensor for sensing a vehicle parameter;
   a vehicle control system for adjusting the vehicle subsystem;
   a memory comprising a register including a bank angle compensation control command; and
   a controller responsive to said sensor and said memory for controlling said vehicle control system;
   wherein said memory further comprises a register having a side-slip rate control gain responsive to a road surface having a bank angle, wherein said side-slip rate control gain is a function of a second side-slip rate control gain responsive to a level road surface.

6. The vehicle stability enhancement system of claim 5, wherein said bank angle compensation control command is responsive to the output signal of a low pass filter applied to the signal of the following equation:

$$G_{BA}=(YR)(V_x)-(Ay).$$

7. The vehicle stability enhancement system of claim 5, wherein said sensor comprises a velocity sensor, a yaw rate sensor, an acceleration sensor, and a front wheel steering angle sensor.

8. The vehicle stability enhancement system of claim 5, wherein said bank angle compensation control command is responsive to the output signal of a low pass filter that removes high frequency content of a side-slip rate of the vehicle.

9. A method for controlling a vehicle stability enhancement system in a vehicle having a vehicle subsystem, comprising:
   sensing a vehicle parameter;
   determining a control gain factor in response to the vehicle parameter;
   determining the state of a control flag in response to the vehicle parameter;
   calculating a control command in response to the control gain factor and the control flag, wherein the control command comprises a bank angle compensation control command, a yaw rate control command, and a side-slip rate control command; and
   actuating a vehicle control system in response to the control command for adjusting the vehicle subsystem;
   wherein said calculating a control command further comprises:
   calculating a control command comprising a feedforward control command, the feedforward control command being determined by a rear wheel steering angle.

10. The method of controlling set forth in claim 9, wherein said actuating a vehicle control system further comprises:
    actuating a braking mechanism control system.

11. The method of controlling set forth in claim 10, wherein said actuating a vehicle control system further comprises:
    actuating a rear wheel steering mechanism control system.

12. The method of controlling set forth in claim 9, wherein said actuating a vehicle control system further comprises:
    actuating a rear wheel steering mechanism control system.

13. A method for controlling a vehicle stability enhancement system in a vehicle having a vehicle subsystem, comprising:

sensing a vehicle parameter;
determining a control gain factor in response to the vehicle parameter;
determining the state of a control flag in response to the vehicle parameter;
calculating a control command in response to the control gain factor and the control flag, wherein the control command comprises a bank angle compensation control command; and
actuating a vehicle control system in response to the control command for adjusting the vehicle subsystem;
wherein said determining a control gain factor further comprises;
determining a first side-slip rate control gain factor for a level surface;
calculating a bank angle compensation control gain factor; and
calculating a second side-slip rate control gain factor for a surface having a bank angle, wherein said second side-slip rate control gain factor is responsive to the first side-slip rate control gain factor and the bank angle compensation control gain factor.

14. The method of controlling set forth in claim 13, wherein said calculating a control command further comprises:
calculating a bank angle compensation control command wherein the bank angle compensation control command is responsive to the output signal of a low pass filter applied to the signal of the following equation:

$$G_{BA} = (YR)(V_x) - (Ay).$$

15. The method of controlling set forth in claim 13, wherein said sensing a vehicle parameter farther comprises:
sensing a vehicle velocity, a vehicle yaw rate, a vehicle acceleration, and a vehicle front wheel steering angle.

16. The method of controlling set forth in claim 13, wherein said calculating a control command further comprises:
calculating a bank angle compensation control command wherein the bank angle compensation control command is responsive to the output signal of a low pass filter that removes high frequency content of a side-slip rate of the vehicle.

* * * * *